Oct. 18, 1932.  J. H. GRAHAM  1,883,709
SHOCK ABSORBING SPRING SHACKLE
Original Filed Feb. 1, 1928
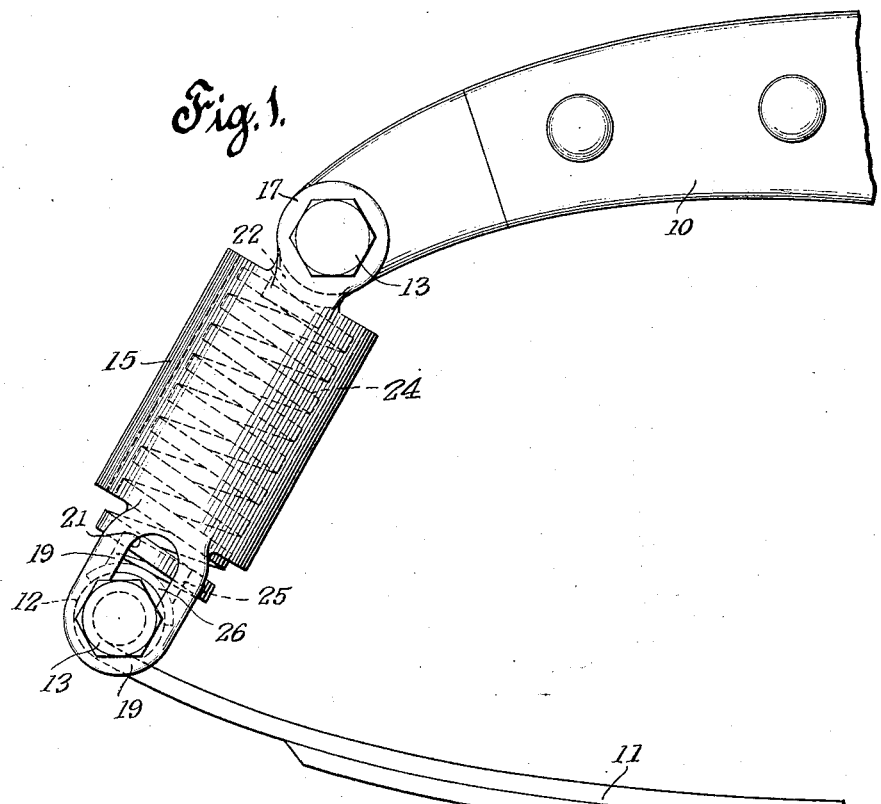
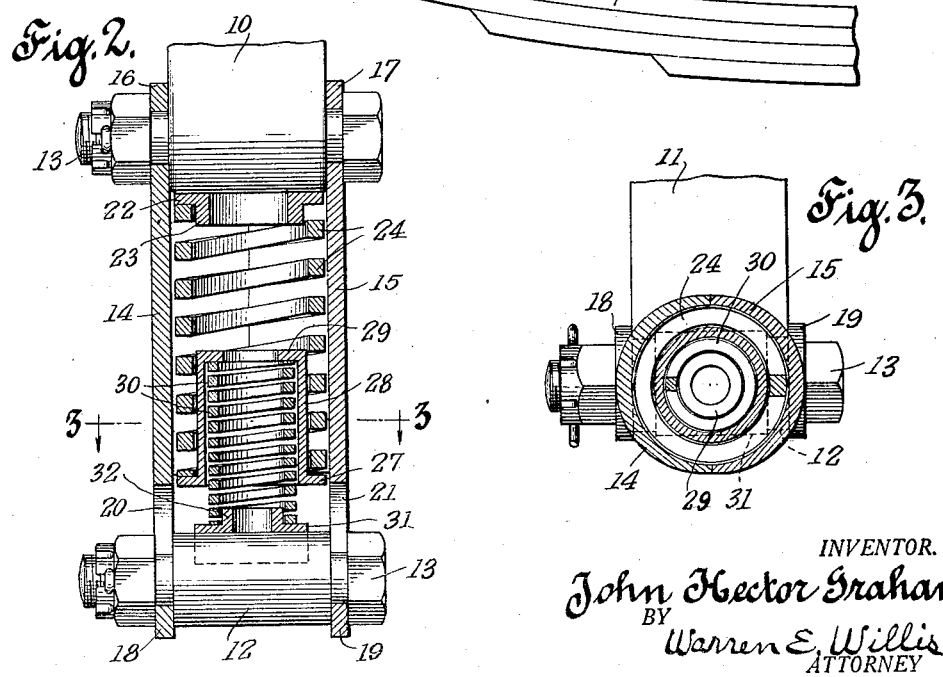
INVENTOR.
John Hector Graham
BY
Warren E. Willis.
ATTORNEY Patented Oct. 18, 1932

1,883,709

UNITED STATES PATENT OFFICE

JOHN HECTOR GRAHAM, OF NEW YORK, N. Y.

SHOCK ABSORBING SPRING SHACKLE

Application filed February 1, 1928, Serial No. 250,965. Renewed February 6, 1932.

This invention relates to spring shackles and more particularly to such as are used in connecting the ends of semi-elliptical leaf springs with the chassis frames of wheeled vehicles.

It is commonly known that bowed, multiple leaved springs exert their resilient effect to the greatest extent when used at their initial set curvature and this effect is decreased proportionately to the degree to which they become flattened.

On the other hand, a spiral spring increases in effect under compression up to its elastic limit.

It is therefore an object of the present invention to provide a combination of leaf and coiled springs, operating conjunctively to produce an easy riding vehicle.

A further feature is in the provision of a series-multiple spring incorporated in the shackle whereby light loads are carried by a correspondingly light spring and transferred to stronger spring associated therewith upon accretion of the load to such degree as to require such increase of resistance.

Another object is to provide a spring shackle to carry the load by springs wholly contained and concealed in the shackle, thus avoiding a rigid and unyielding link as ordinarily used, such stiff links operating to transmit shocks, jars and vibrations from the semi-elliptic leaf springs directly to the vehicle.

A still further feature is in the provision of a shock absorbing spring shackle, new in principle, neat in design, effective in operation and economical to construct.

These and other advantageous objects are accomplished by the novel construction, combination and arrangement of parts, hereinafter described and shown in the accompanying drawing, forming a material part of this disclosure, and in which:—

Figure 1 is a side elevational view of parts of a chassis frame, leaf spring and a shackle, made in accordance with the invention, connecting therebetween.

Figure 2 is a longitudinal sectional view taken through a shackle, showing a modification in spring arrangement.

Figure 3 is a transverse sectional view taken on line 3—3 of Figure 2.

Referring in greater detail to the drawing, the numeral 10 designates one of the side members of a conventional chassis frame in which the forward end of which is rigidly secured the usual terminal constituting a unit.

The semi-elliptical, plurally leaved spring 11 has its uppermost leaf extended progressively outward and its end 12 coiled to produce a cylindrical socket.

Bolts 13 pass through the ends of the frame 10 and socket 12 respectively, the same being provided with castellated nuts, preferably held by cotter pins as shown, all these several parts being of well known type.

The invention resides in the shock absorbing spring shackle, which consists of two equal and uniform shells 14—15, each being semi-cylindrical in cross section and having at one end flattened pads 16—17, generally circular in profile and provided with round openings, through which the frame carried bolt passes, constituting in effect a fork to straddle the end of the chassis frame.

At the opposite ends these link members have similar but elongated pads 18—19 spaced to receive the coiled spring end 12, the pads having elongated slots 20—21, through which the spring carried bolt passes, being free to move in the slot as the link is moved downwardly.

As shown in Figure 1, a collar 22 having a concave upper face is seated on the frame end, the lower portion of the collar being flat and having at its center an annulus 23 to enter and guide the upper end of a helically coiled compression spring 24, the lower end of which abuts a similar but reversed collar 25 having a reduced concave portion 26 to seat upon the coiled end 12 of the semi-elliptical spring.

In the preferred embodiment of the invention, shown in Figures 2 and 3, the lower end of the spring 24 is seated on an annular flange 27 extending outwardly from a cup 28 having a bottom 29, the cup loosely extending into the spring 24.

A second helically coiled spring 30 is disposed in the inverted cup 28 to press against its bottom 29, the lower end of the spring 30 being seated on a washer curved at its under side to engage the spring end 12 and provided with an annulus 32 to guide the spring.

In operation, the inner springs 30 are adapted to support the vehicle, unless heavily loaded, in such manner as to compensate for ordinary jolts, the spring carried bolt moving freely up and down in the slots 20—21, eliminating the transmission of jars to the vehicle.

Obviously, should the jolts be of sufficient magnitude to close the spring 30 temporarily, the outer and far stronger springs 24 will come into operation, and before the bolts have risen to the limit of the slots in the shackles and that the weight of the vehicle is supported on the spiral spring and not the shackles or shackle bolts, the advantages of which are many.

Although this invention has been described with reference to a particular embodiment, it is understood that changes in construction and details thereof may be made within the scope of the appended claims.

Having thus described my invention, what I claim as new and desire to secure by Letters Patent, is:—

1. A link connecting a vehicle frame member and a semi-elliptical spring to support said member, said link comprising a tubular body pivoted to the extreme end of the frame member, slotted connections at the opposite end of said body to engage the spring end, said body disposed wholly between the member and spring, and a helical compression spring enclosed in said body respectively abutting the frame member and spring.

2. A link connecting a vehicle frame member and a semi-elliptical spring to support said member, said link comprising a tubular body positioned intermediate the member and spring pivoted at one end to the frame member at its extremity to extend at an angle outwardly therefrom, slotted connections at the other end engaging the spring end and limitedly movable thereon, opposed collars in said body seated on the frame member and spring end respectively, a helically coiled compression spring exerting pressure between said collars, and projections on the proximate sides of said washers extending into the ends of said coiled spring.

3. The combination with a vehicle frame and a semi-elliptical spring to support the frame, of a link composed of two equal semi-cylindrical elements constituting a tube having its entire length disposed between the member and spring, lugs on the ends of said elements arranged in opposed pairs, one of said pairs being longitudinally slotted, bolts passing through said lugs to pivotally connect the ends of said link with the frame and spring respectively, one or more helical springs in said tube, and seats to receive the thrust of said springs, said seats abutting the frame and semi-elliptical springs respectively at their outer extremities.

4. A spring shackle comprising a hollow body having a pair of lugs at each end, one pair being slotted, pivot bolts connecting said lugs to the extremities of the spring and object supported thereby, said body being wholly contained in the space between said spring and object, and compressive resilient elements in said body to exert pressure between the spring and object to the limit of the slotted lugs.

5. The combination with a vehicle frame and a semi-elliptical spring to support the frame, of a spring shackle link composed of a tube having two equal longitudinal sections, said link being wholly disposed intermediate said frame and spring, opposed pairs of lugs constituting forks at each end of the tube to engage the frame and spring respectively at their extreme ends, one of said forks being slotted lengthwise, bolts pivotally connecting the forks to the frame and spring, and resilient elements in said tube held under compression between the frame and spring.

6. The combination with a vehicle frame and a semi-elliptical spring to support the frame, of a spring shackle link composed of a tube having two equal longitudinal sections, opposed pairs of lugs constituting forks at each end of the tube to engage the frame and spring respectively whereby the tube is held as a unit wholly therebetween, one of said forks being slotted lengthwise, bolts pivotally connecting the forks to the frame and spring at their outer extremities, a coiled spring in said body between the frame and semi-elliptical spring, and a second coiled spring of greater resistance enveloping the first coiled spring as an auxiliary thereto.

7. The combination with a vehicle frame and a semi-elliptical spring to support the frame, of a spring shackle link composed of a tube, lugs on the ends of said tube pivotally engaging the frame and spring at their outer extremities respectively, slots in said lugs permitting limited longitudinal movement of said semi-elliptical spring extremity, a helical spring, a seat on the semi-elliptical spring, over the pivot, to receive one end of the helical spring, an inverted cup to receive the other end thereof, a second helical spring of greater diameter and strength to rest upon the rim of said cup, and a seat for the other end of the last spring abutting the frame.

8. A spring shackle link composed of a tubular body having pivoted connections at one end and slidable connections at the other end, main and auxiliary springs in said body to exert pressure to the limit of the slidable connections and an inverted flanged cup in said body, the flange of said cup receiving the thrust of the main spring, the auxiliary spring being seated in said cup.

In testimony whereof I affix my signature.

JOHN H. GRAHAM.